Figure 3:
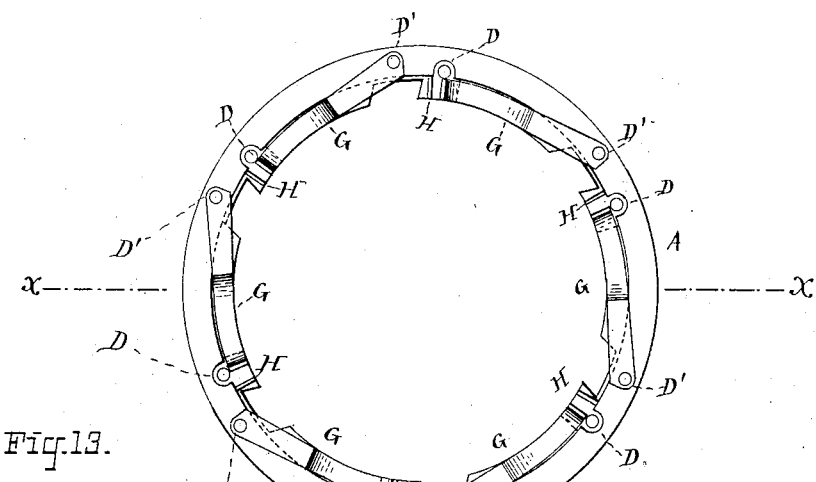

(No Model.)  4 Sheets—Sheet 1.
C. A. CHEEVER & W. L. CANDEE.
CHANDELIER FOR ELECTRIC CANDLES.
No. 266,969.  Patented Nov. 7, 1882.
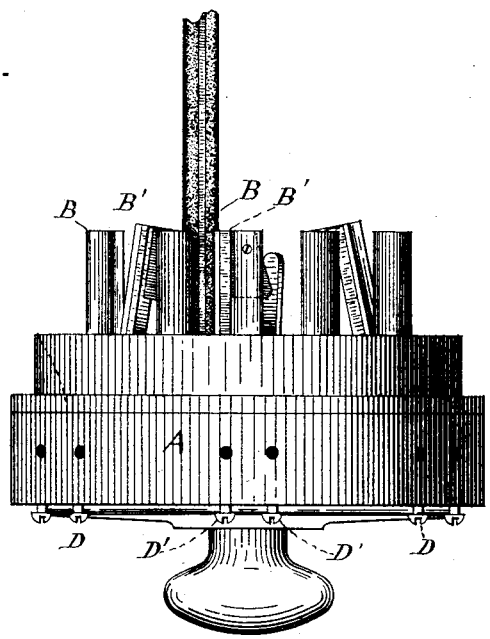
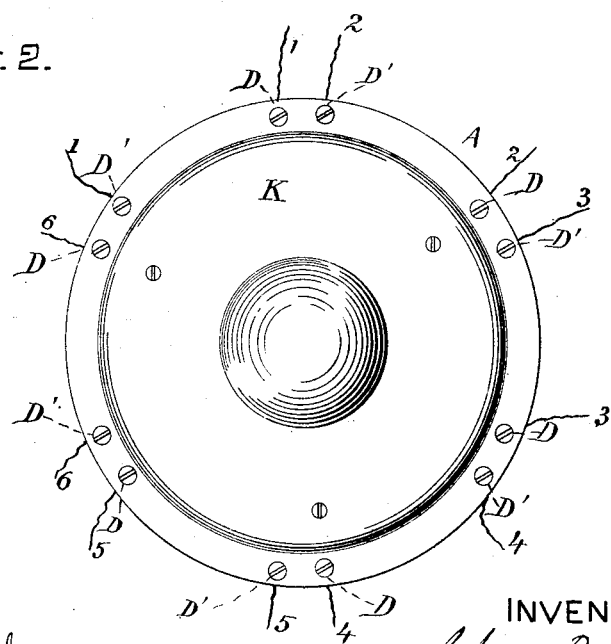
ATTEST:
Julian A. Hurdle.
Thos Toomey
INVENTORS
Chas. A. Cheever
W. L. Candee
by B. C. Townsend
Atty (No Model.) 4 Sheets—Sheet 2.

C. A. CHEEVER & W. L. CANDEE.
CHANDELIER FOR ELECTRIC CANDLES.

No. 266,969. Patented Nov. 7, 1882.

ATTEST:
Julian A. Hurdle.
Thos Toomey

INVENTORS
Chas A. Cheever,
W. L. Candee,
by H. E. Townsend,
Atty.

(No Model.) 4 Sheets—Sheet 3.
C. A. CHEEVER & W. L. CANDEE.
CHANDELIER FOR ELECTRIC CANDLES.
No. 266,969. Patented Nov. 7, 1882.
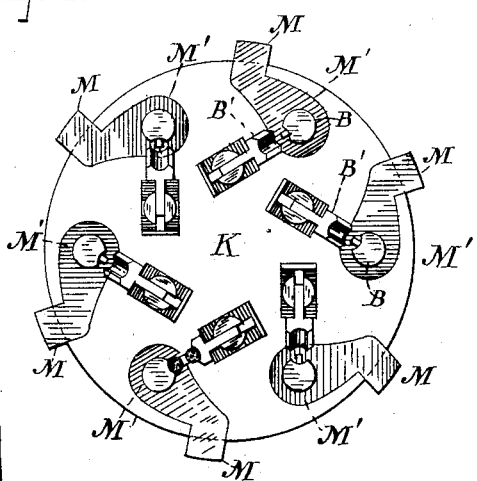
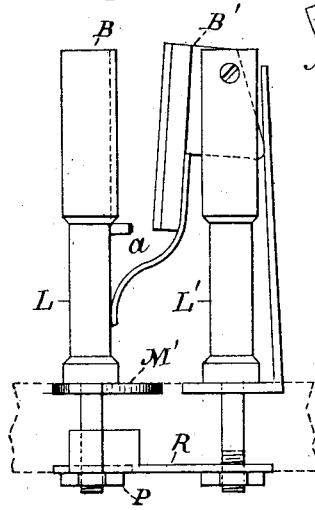
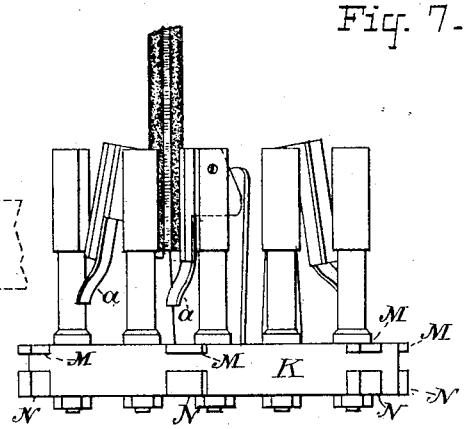
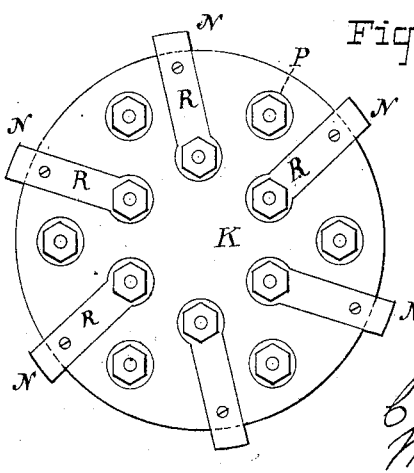
ATTEST:
Julian A. Hurdle.
Thos Toomey
INVENTORS
Chas A Cheever
W L Candee
by H C Townsend
Atty.

(No Model.) 4 Sheets—Sheet 4.

C. A. CHEEVER & W. L. CANDEE.
CHANDELIER FOR ELECTRIC CANDLES.

No. 266,969. Patented Nov. 7, 1882.

ATTEST:
Julian A. Hurdle.
Thos Toomey

INVENTORS
Chas. A. Cheever
W. L. Candee
by H. C. Townsend
Atty.

UNITED STATES PATENT OFFICE.

CHARLES A. CHEEVER, OF NEW YORK, AND WILLARD L. CANDEE, OF BROOKLYN, N. Y.

CHANDELIER FOR ELECTRIC CANDLES.

SPECIFICATION forming part of Letters Patent No. 266,969, dated November 7, 1882.

Application filed May 3, 1882. (No model.)

*To all whom it may concern:*

Be it known that we, CHAS. A. CHEEVER and WILLARD L. CANDEE, citizens of the United States, residing respectively at New York, in the county of New York and State of New York, and at Brooklyn, county of Kings, and State of New York, have invented certain new and useful Improvements in Chandeliers for Electric Candles, of which the following is a specification.

Our invention relates to chandeliers for electric candles, of the type known as the "Jablochkoff candle;" and the object is to provide a means whereby the part of the chandelier upon which the candle holder or holders are mounted may be readily removed or detached from the parts supporting it, for the purpose of renewing the spent or broken candles without danger of disrupting the general circuit or circuits leading to and through the chandelier.

To this end our invention consists of certain novel combinations of a base-block or support for the candle-holders, a supporting ring, block, or equivalent device to which the base-block may be attached or supported and from which it may be removed and continuity-preserving electric switches seated in or upon the supporting ring or block, to which latter the general circuit wire or wires are connected, and adapted to automatically complete a branch circuit for the general current when the base-block support with the candle holder or holders is removed, the nature of which combination will be readily understood from the accompanying specification and drawings, and will be specified in the claims.

Our invention also consists in the combination, with the switch, the supporting-ring, and the base-block with its attached carbon-holders arranged to act in the manner before specified, of devices for locking or holding the base-block in place, the combination being such that the act of turning or moving the base-block so as to disconnect or unlock it from the supporting-ring will cause the switch to complete the proper connections to form a branch circuit.

Figure 13:
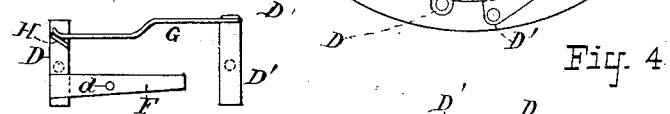
Figure 4:
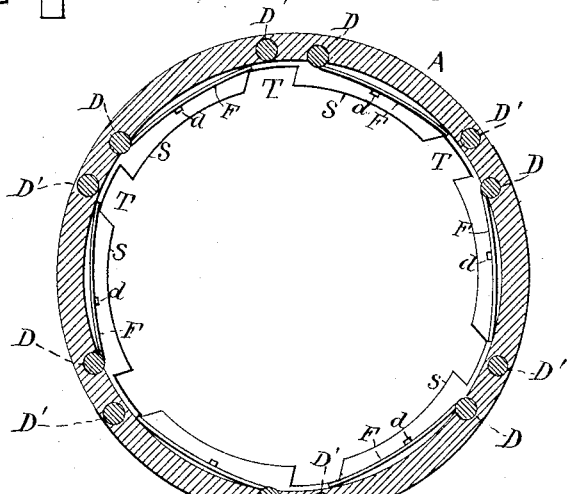
Figure 5:
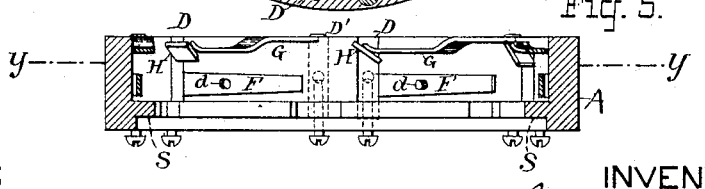
Figure 10:
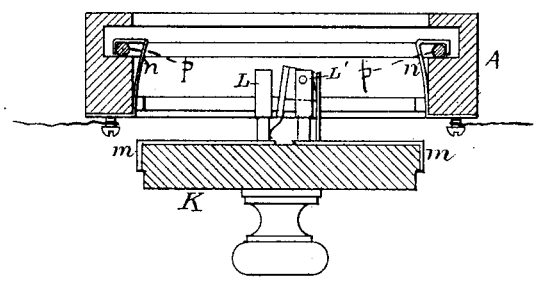
Figure 11:
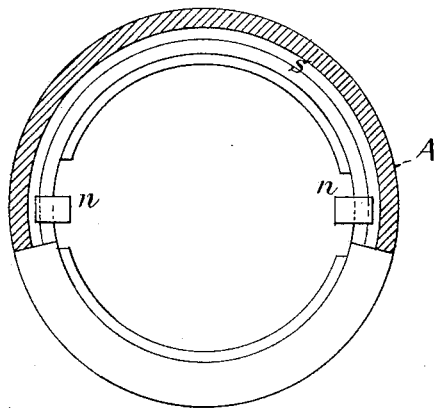
Figure 12:
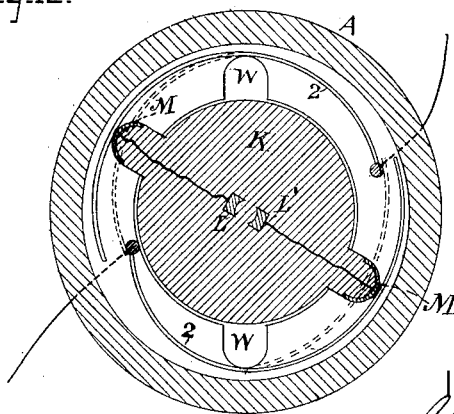

In the accompanying drawings are illustrated several of the various devices that may be employed for carrying out our invention. Figure 1 is a side view of a chandelier containing our invention. Fig. 2 is a bottom view of the same. Fig. 3 is a top view of a supporting-ring, to which the block carrying the candle holder or holders may be connected, and on which are mounted the electric switches. Fig. 4 is a horizontal section on the line $y\ y$ of Fig. 5. Fig. 5 is a vertical cross-section on the line $x\ x$ of Fig. 3. Fig. 6 is a top view of the candle-holders and the block or the support for the same. Fig. 7 is a side view of Fig. 6, showing one of the candles in position, and also the contact plates, blocks, or studs, by which the switches are operated, and through which the circuits to the candle holders or clamps are completed. Fig. 8 is a bottom view of Fig. 7. Fig. 9 is a side view of a single clamp or holder, illustrating the construction and manner of attachment of the switch-operating and circuit-closing studs or blocks. Figs. 10 and 11 illustrate another method of carrying out our invention. Fig. 12 shows a modification of the device illustrated in Figs. 1 to 8 as applied to a lamp having a single candle holder or clamp. Fig. 13 shows detail parts separated from the supporting-block. In Figs. 1 to 8 the chandelier is supposed to be employed with a system having six general-circuit wires, one wire for each candle, the current being shifted from one wire to the other by hand or by any suitable devices so soon as the candles on any one circuit have been consumed.

A represents a ring or block, of any suitable form or construction, to or from which the base or block carrying the candle-holders B B' is attached or supported, said ring A being permanently mounted in any desired locality by any proper means. K is the base-block, upon which the candle-holders B B' are mounted.

Seated in or attached to the ring or support A are pairs of binding-posts D D', to which the entrance and exit wires of the six general circuits are connected, and to which are connected the switches mounted upon the interior of the ring A in the manner shown in Figs. 3, 4, and 5.

Connected to the top of each post D', in any suitable manner—as, for instance, by soldering—so as to be in electrical connection therewith, is a spring, G, whose free end is adapted to make rubbing-contact with a plate or stud, H, which latter is supported by, soldered to, or in any suitable manner electrically connected with the other post, D, of each pair. The spring G is removed from contact with the plate H by a stud or projection upon the base-block for the candle-holders in a manner to be presently described, and also serves to convey the electric current to one post of the clamp or holder for a candle. Electrically connected with each post D is a spring or contact-plate, F, which is soldered to said post, or may be attached thereto in any suitable manner, and extends toward the post D' of the pair of binding-posts of which D forms one post. Through said plate or spring F the current is conveyed to one of the two posts of a clamp or holder of the candle, with the other of whose posts the spring G is connected when the base-block for the candle holders is inserted into the ring in the manner to be presently described. When spring G is in contact with H the path of the current on the circuit connected to the corresponding binding-posts D D' is directly from one binding-post to the other. When the spring is removed from contact with H the current passes from G to one clamp-post of a candle and back from the other clamp-post to the plate or spring F.

The devices whereby the requisite changes in the circuit are produced are shown in Figs. 6, 7, 8, 9.

K represents the base-block or support, of any suitable material, upon which the candle-holders B B' are mounted, the latter being of any ordinary or suitable construction, and consisting, as here shown, of a fixed jaw, B, mounted upon a conducting-post, L, and a movable jaw, B', mounted upon a similar conducting-post, L'. The posts L are secured to the base-block in the ordinary or in any other suitable manner, the means here shown being a nut, P, which engages with a screw-thread upon the lower end of the post L and bears against the under side of the block K.

Clamped between a shoulder on the post L and the block K is a plate, M', of some conducting material, which terminates in, or may be electrically connected by any suitable means with, a block, stud, or projection, M, which extends beyond the edge of the base K, and serves to make electrical connection between the post L and the spring G, and, in the present instance, serves, also, when the base-block and attached candles are placed in position for use, as a means for operating the spring so as to cause it to break contact with the plate H. It will be obvious, however, that the means employed for operating said spring might be independent of the device used for making electrical connection between the post and clamp B and the binding-post to which spring G is connected, in which case the operating lug or projection might be of any material whatever.

The post L' of each clamp or holder B B' is electrically connected with a contact stud, block, or projection, N, each of the latter being in the present case placed immediately below the stud M, connected to the post L of the same clamp or holder. The relative position may, however, be varied, suitable changes of course being made in the disposition of the parts upon which the projections M and N act. The projection N is an extension of a conducting-plate, R, clamped to the bottom of the block K by a nut upon the end of the post L', with which latter the plate is thus put in electrical connection. Other means might, however, be used for making electrical connection between the post L' and the contact stud or projection N.

By constructing the ring or support A in the manner shown in Figs. 3, 4, and 5 the projections N serve to hold the block K and the attached candle-holders in place in said support. This is accomplished by forming an annular ledge, S, upon the inside and lower part of the ring or block A, and making notches or recesses in said ledge at points T, corresponding to the position of the projections N M upon the block K, so that the block K may be raised into place and may then, by turning it, be made to rest with the projections N upon the ledge.

The operation of the devices as thus constructed is as follows: When the block K is out of its support the springs G rest by their own elasticity in contact with the contact-plates H, and the path of the current for each general circuit is, as before explained, from the post D' of that circuit to the post D through spring G and contact H. When the block K is inserted and turned the projections M ride under the springs G, thus raising them from a contact with the plates H, and make electrical connection, said springs thus completing the circuit from the binding-posts D' to the posts L of the stationary portion of the candle-holders. At the same time the contact studs or projections N come into electrical contact with the plates F, thus simultaneously completing the circuit between the binding-posts D and the posts L', to which the movable portions of the candle-holders are attached. The plates F are sufficiently long or are so located that the latter connection is made before the point in the turning movement of block K is reached where the studs M will lift the springs G. By this means the circuits through the candle-holders are completed before the direct or short circuits from G to D are broken, thus preserving the continuity of the general circuits. When the block K is removed for the purposes of renewal of the candles, the circuit-closing spring G completes the short or direct circuit from D' to D before the studs N and M leave contact. Steps d, against which the studs N strike, serve to limit the turning movement of the block K when it is placed in its support and turned for the purpose of locking it therein.

As a means of preventing a disruption of a general circuit by the removal of a candle when the parts are all in place, we propose to use the additional feature of a spring, $a$, Figs. 7 and 9, which is attached to the movable jaw of a clamp and makes contact with the fixed jaw when a candle is removed. This device, however, forms the subject of another application, and we therefore make no claim to it herein.

We do not desire to limit ourselves to any particular construction of the switch in the support A, nor to any particular form of the latter, as it will be obvious to those skilled in the art that many other switch devices may be employed and so arranged that when the block or support K, with attached candle-holders, is put in place said switch will be operated and caused to break the short or branch circuit for each general circuit, while, conversely, when the block K is withdrawn, the short or branch circuit will be completed. Neither do we confine ourselves to any particular construction of the devices upon block K for operating said switches, nor to any particular means for completing the circuit between the two sides of the candle-holders and the two binding-posts to which the two wires of each general circuit are connected at the same time that the switches are operated, as it is obvious that these devices may be of many forms, differing only in detail, and that the circuit-closing devices for completing the circuits to the candle-holders may be independent of the switch-operating devices and the movable switch-springs in the support A.

In the modification shown in Figs. 10 and 11, $m\ m$ represent contact-plates upon the side of the candle-holder support K, electrically connected in any suitable manner with the two parts L L' of the candle-holder, and arranged to come into contact with springs $n\ n$, to which the two wires of the general circuit are connected. The springs $n\ n$ are seated in the recesses in the block A, and by their own elasticity will, when the support K is removed, make contact with studs or stops $p\ p$, which form the terminals of a wire, strip, or connecting-piece, S, placed in block A, and shown more clearly in Fig. 11, which is a horizontal section of Fig. 10. When the springs $n$ are in contact with stops $p$ the general circuit is through said springs and stops and the connecting-strip S. When the block K is inserted the latter connection is broken, and the circuit is then from one spring $n$ through the plate $m$, in contact therewith, to the candle-holder, to the other plate $m$ and spring $n$. In this construction the mere placing of the candle-support in position in the chandelier operates the switch. Independent devices of any suitable construction are to be employed for holding it in place. The springs $n\ n$ are here shown as placed at diametrically-opposite points, a single candle only being used. It is obvious, however, that they might be placed on the same side of the block A and near to one another, the two plates $m\ m$ having a corresponding location upon the base-block K, and that any desired number of pairs of such springs and contact-operating plates $m\ m$ might be employed, corresponding to the number of general circuits and candle-holders mounted upon the block K.

Fig. 12 is a horizontal cross-section through a lamp having a single candle-holder and provided with a switch of a construction differing but slightly in its details from that heretofore described. K represents the base-block, upon which the candle-holder is mounted. M M are projections from said block, faced at their outer ends with contact-plates, which are electrically connected with the candle-holder posts L L'. Springs 2 2, mounted in a groove in the support A, are connected to the general circuit, and the free end of each is adapted to come into contact by its own elasticity with the stud upon which the other spring is mounted, or with a stop electrically connected with said spring, thus completing the connection directly between the two wires of the general circuit. When the block K is raised into the proper position by passing the projections M M up through the slots W in the support A, and is then turned so as to lock it to the support A, the projections M displace the springs from contact with their stops, thus breaking the short path for the general circuit and making electrical connection between the two sides of the candle-holder and the two springs through the contact-plates in the ends of said projections. As is obvious, the contact and connection between the springs and the plates connected to the candle are made before the springs are removed from direct or short connection with one another. The continuity of the general circuit is thus preserved.

What we claim as our invention is—

1. The combination, substantially as described, of the base-block K, the candle-holders B B', mounted thereupon, the supporting ring or block for said base-block, electric switches mounted in said supporting-block for completing the general circuit when the base-block is removed, and means, as described, connected to said base-block for operating said switches when the base-block is placed in position.

2. The combination, substantially as described, of the block or support K, the candle holder or holders B B', mounted thereupon, a supporting ring or block, an electric switch or switches mounted therein and connected to the two wires of the general circuit, and one or more studs or projections upon the block K, arranged, as described, to bear against and operate the movable portion of the switch or switches when the support K is placed in position.

3. The combination, substantially as described, of the base-block K, a candle-holder, B B', mounted thereupon, a supporting ring or block for said base-block, binding-posts, and a switch mounted in said supporting-block, means connected to the base-block for operating the switches, and circuit-closing plates or surfaces for completing the electrical connection to the candle-holder when the circuit through the electric switch is opened.

4. The combination, substantially as described, of the base-block K, posts L L' for the candle-holders, projecting plates or studs upon the base-block, electrically connected with the posts L L', and spring-switches mounted in the support for said base-block and arranged in the manner described, so that the projecting plates or studs will open the switches when the block is placed in position, and will simultaneously complete the connection to the candle-holders.

5. The combination, substantially as described, of the supporting-ring A, the spring-switches mounted therein and tending by their own elasticity to complete the connection between the two wires of the general circuit, the base-block K, supporting the candle-holders, and projections upon said base-block, electrically connected to the candle-holders and arranged in the manner described, so as when the block is placed in position to bear against the spring-switches, thus breaking the circuit through the same and simultaneously completing a circuit to the candle-holder.

6. The combination, substantially as described, of a base-block, K, a candle-holder mounted upon the same, a contact plate, lug, or projection upon said block, electrically connected with one side of the candle-holder, a spring upon the support for said base-block, electrically connected to one of the general-circuit wires, and normally tending to make contact with a stop electrically connected to the other circuit-wire, said spring being arranged, as described, so that when the base-block is placed in position the contact plate, lug, or projection upon the same will bear against the spring, making connection with the same, and simultaneously removing said spring from its stop.

7. The combination, substantially as described, of the ring-support A, the binding-posts mounted therein, the springs G, connected to one binding-post of a pair, and adapted to make contact with a stop connected to the other binding-post of a pair, a contact plate, spring, or surface permanently connected to the latter, a supporting-block or base-piece for the candle-holders, and two contact lugs or projections for the two sides of each candle-holder, said lugs or projections being arranged, as described, so that when the block by which they are carried is placed in position one of them will make contact with the spring G and remove it from contact with its stop, while the other will come into contact with the plate, stud, or projection connected to the binding-post to which said stop is connected.

Signed at New York, in the county of New York and State of New York, this 1st day of May, A. D. 1882.

CHAS. A. CHEEVER.
    WILLARD L. CANDEE.

Witnesses:
 WM. H. CHURCH,
 ROBERT J. CUMMINGS.